Figure 1:
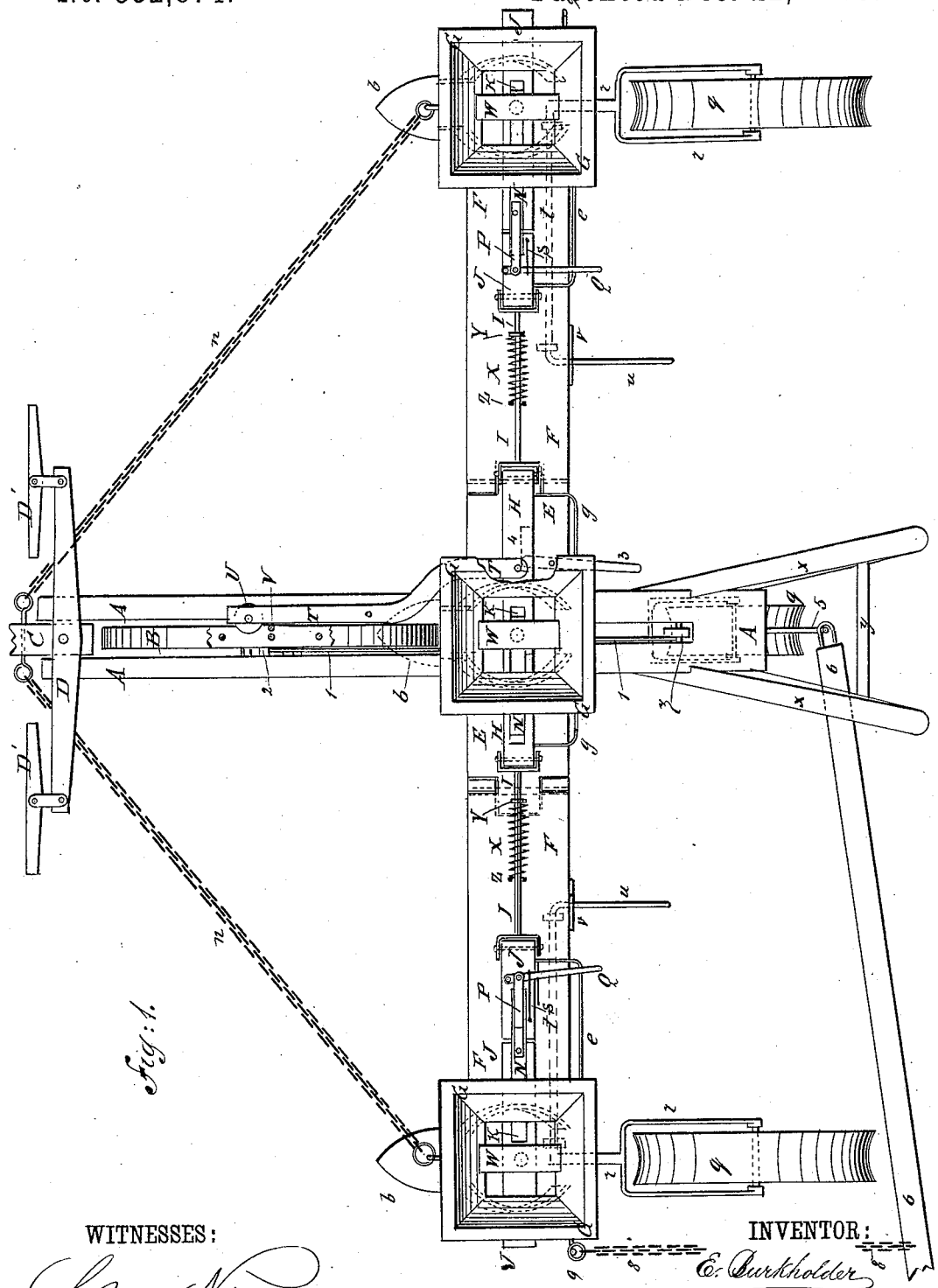

(No Model.)

3 Sheets—Sheet 1.

E. BURKHOLDER.
CORN PLANTER.

No. 332,874. Patented Dec. 22, 1885.

WITNESSES:
Chas. Nida
C. Sedgwick

INVENTOR:
E. Burkholder
BY Munn & Co
ATTORNEYS.

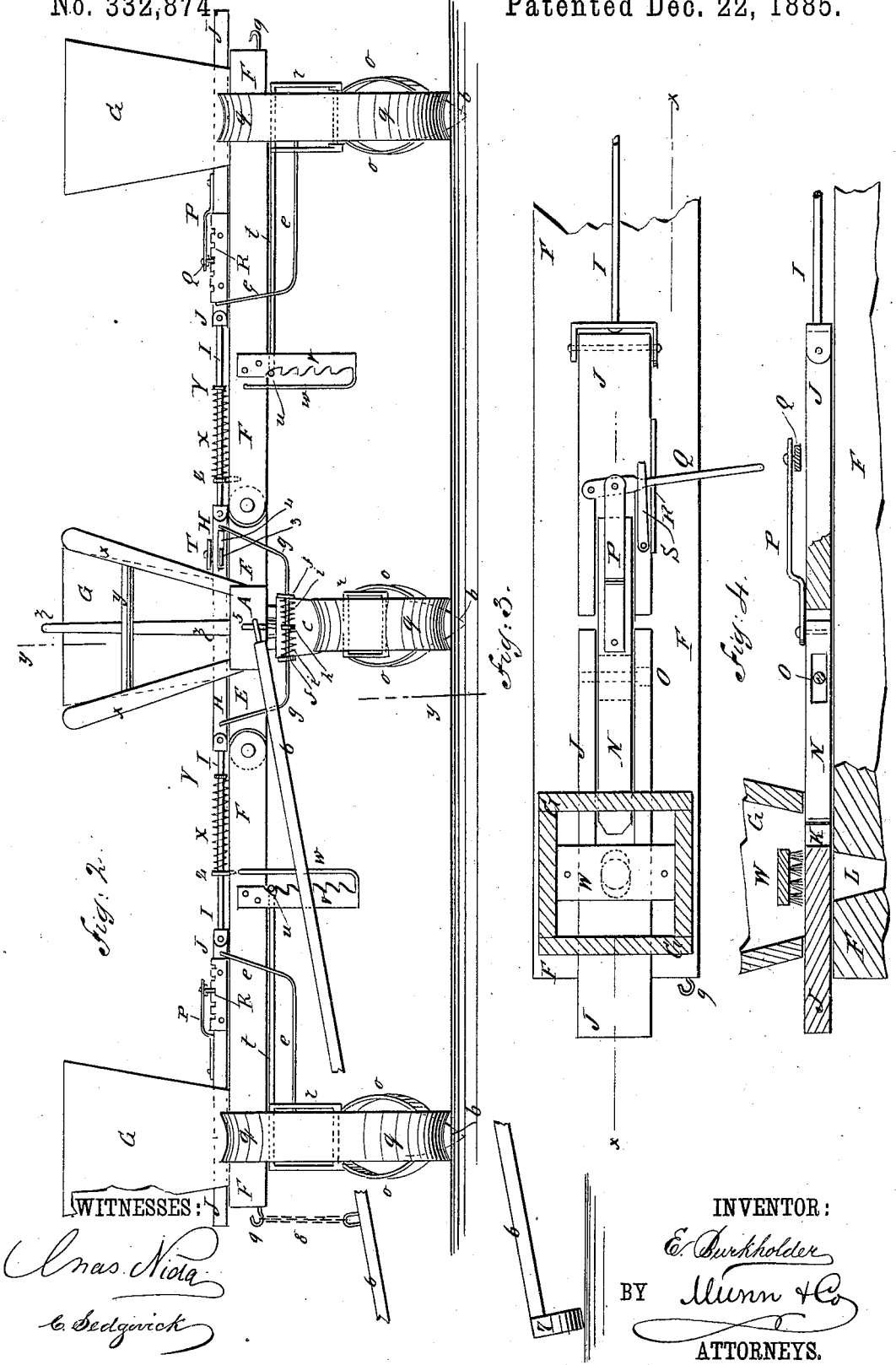

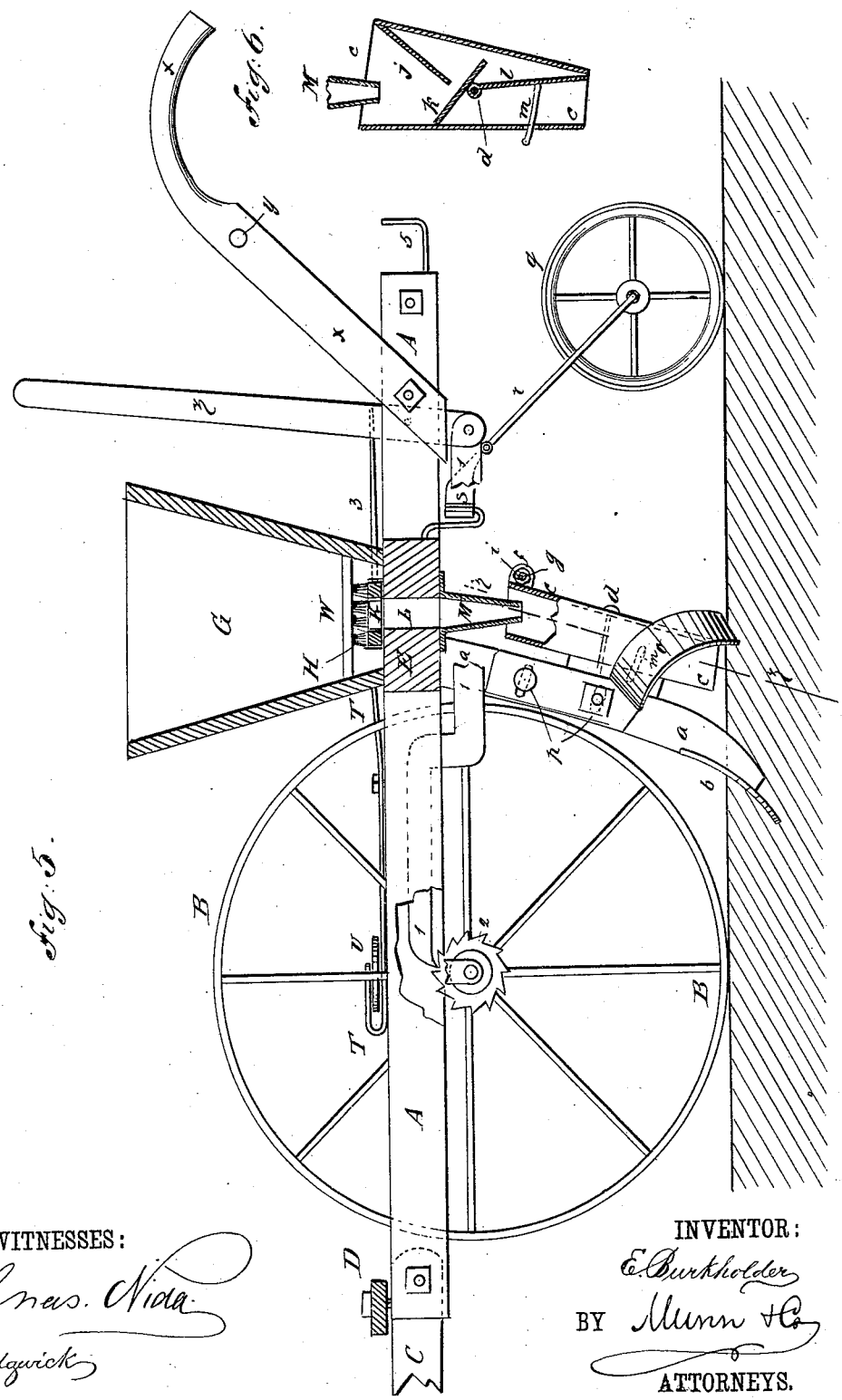

UNITED STATES PATENT OFFICE.

EDWARD BURKHOLDER, OF GLENDALE, KENTUCKY.

CORN-PLANTER.

SPECIFICATION forming part of Letters Patent No. 332,874, dated December 22, 1885.

Application filed July 20, 1885. Serial No. 172,124. (No model.)

*To all whom it may concern:*

Be it known that I, EDWARD BURKHOLDER, of Glendale, in the county of Hardin and State of Kentucky, have invented certain new and useful Improvements in Corn - Planters, of which the following is a full, clear, and exact description.

Reference is to be had to the accompanying drawings, forming part of this specification, in which similar letters of reference indicate corresponding parts in all the figures.

Figure 1 is a plan view of one of my improved corn - planters, parts being broken away. Fig. 2 is a rear elevation of the same, parts being broken away. Fig. 3 is a plan view of a part of the seed-dropping slide, one of the seed - boxes being shown in section. Fig. 4 is a rear elevation of the same, partly in section, through the line $x\ x$, Fig. 3. Fig. 5 is a sectional side elevation of the planter, taken through the line $y\ y$, Fig. 2, parts being broken away. Fig. 6 is a sectional rear elevation of one of the seed-conducting spouts, taken through the line $z\ z$, Fig. 5.

The object of this invention is to provide corn-planters constructed in such a manner that they can be readily controlled, will adapt themselves to uneven ground, and can be readily adjusted to plant three rows at a time or a single row, as may be required.

The invention consists in the construction and combination of various parts of the planter, as will be hereinafter fully described, and then pointed out in the claims.

A represents the plow-beam, which is slotted to receive the driving-wheel B. The driving-wheel B is journaled to bearings attached to the beam A. To the forward end of the beam A is hinged a tongue, C, to which is attached a double-tree, D, provided with whiffletrees D' in the ordinary manner. To the rear part of the plow-beam A is rigidly attached the center of a short cross-bar, E, to the ends of which are hinged the inner ends of the bars F, forming continuations of the said cross-bar E. To the center of the cross-bar E and to the outer ends of the hinged bars F are attached the seed-boxes G. In the lower part of the central seed-box G is placed a short bar or slide, H, to the ends of which and at or near the hinges of the bar E F are hinged the forked ends of rods I. The forked outer ends of the rods I are hinged to the inner ends of bars J, which slide in openings in the lower parts of the side seed-boxes G, the bars H J, and the rods I, thus forming the seed-dropping slide. The parts of the bars H J J that work in the seed-boxes G have holes K formed through them to receive seed and drop it through the apertures L in the bar E F and through the spouts M, attached to the lower side of the said bar. The bars H J J are slotted at one side of the holes K, and in the said slots are placed short bars N, of a less length than the slots, and which are held in place by set-screws O, so that the said bars N can be readily adjusted to regulate the size of the holes K, according as more or less seed is to be dropped for a hill. The holes L are oblong at their upper ends, and are tapered to a circle at their lower ends to prevent the seed from being caught between the slide and the edges of the said holes. The bars J are made in two parts and with a tongue upon the end of one part to enter a slot in the adjacent end of the other part and keep the said parts in line with each other. To the outer parts of the bars J are pivoted the ends of rods P, the other ends of which are pivoted to the levers Q. The forward ends of the levers Q are pivoted to the inner parts of the bars J, and their rear parts cross the toothed edges of the catch-plates R, attached to the rear edges of the said parts, so that the length of the said bars J can be readily adjusted to bring their seed-receiving holes to the right position. The levers Q are held down upon the catch-plates R by springs S, attached to the bars J, and which rest upon the said levers Q. To one end of the slide H is pivoted the rear end of a lever, T, which is curved to pass around the corner of the seed-box G, and is fulcrumed to the beam A a little in front of the said seed-box. The forward part of the lever T extends along the side of the drive-wheel B, and has a small friction-wheel, U, pivoted to its forward end in such a position as to be struck successively by the spokes V, attached the hub and rim of the said wheel at the sides of the ordinary spokes so as to strike the wheel U, while the ordinary spokes of the wheel B pass the said wheel U without touching it. When two side spokes, V, are used, the seed will be dropped at distances apart equal to half the circumference of the wheel B. If the seed is to be planted at a less distance apart, a greater number of spokes than two must be used. The side spokes, V, must always be at equal distances apart. With this construction, as each side spoke, V, comes in contact with the friction-wheel U it causes the lever T to move the seed-dropping slide H I J, bringing the seed-receiving holes K over holes L in the bars E F and dropping the seed. The bars H J are kept from carrying out any more seed than is contained in the seed-receiving holes K by cut-off brushes W, placed directly over the said holes K and attached to the seed-boxes G. As the wheel U passes off each side spoke, V, and the lever T releases the seed-dropping slide H I J, the said seed-dropping slide is drawn back to its former position by the springs X, placed upon the connecting-rods I, with one end resting against collars Y, formed upon or attached to the said rods, and with their outer ends resting against guides Z, attached to the bars F, and through which the said rods I slide. To the forward parts of the lower side of the bar E F, directly in front of the apertures L, are attached the upper ends of the standards a, to the lower ends of which are attached the plows b, by which furrows are opened to receive seed. The seed is guided from the spouts M into the furrows opened by the plows b by the chutes c, which are pivoted to the rear sides of the standards a by the bolts d, passing through the middle parts of the said chutes and into or through the said standards. To the upper ends of the side chutes, c, are attached the ends of rods e, which extend inward, are bent upward, and their inner ends are attached to the end parts, J, of the slide. Through guide-lugs f, attached to the upper rear corners of the center chute, c, passes the middle part of a rod, g, the ends of which are bent upward, and are attached to the end parts of the central part, H, of the slide. Upon the center of the rod g is formed or to it is attached a collar, h, against the opposite sides of which rest the inner ends of two spiral springs, i. The outer ends of the springs i rest against the guide-lugs f. With this construction the chutes c will be vibrated by the movements of the seed-dropping slide H I J, and will be brought to a central position when released by the elasticity of the springs i, the oblong holes in the lugs f allowing the rods g to have a slight up-and-down movement. Within the upper part of each chute c is placed an inclined plate, j, upon which the seed from the spout M falls and down which it slides. From the lower edge of the inclined plate j the seed falls upon the plate k, inclined in the opposite direction from the plate j, and secured in the middle part of the chute c. From the lower edge of the inclined plate k the seed drops into the lower part of the chute c. To the pivot-bolt d, below the middle part of the lower plate, k, is attached the upper end of a plate, l, which extends down through the lower part of the chute c, and is held stationary by a bent-rod, m, attached to the said plate l. The bent rod m passes through a hole in the chute c, and its outer end is attached to the standard a. The plate l and the chute c are so arranged that the lower end of the side of the said chute will rest against the lower end of the stationary rod m when the seed-dropping slide H I J is in its normal position, so as to retain any seed that may be between the said side and plate. As the seed-dropping slide H I J in its forward movement brings the holes K over the holes L and drops the seed, the chutes c are swung away from the plates l and drop the seed detained between the said plates and the sides of the chutes into the furrow. At the same instant the friction-wheel U passes off the side spoke, V, and the springs X return the seed-dropping slides H I J and the chutes c to their normal position, so that the seed will be caught and detained between the sides of the chutes and the plates, the inclined plates delaying the downward passage of the seed sufficiently to allow the said chutes to make their return movement before the said seed reaches the lower ends of the said chutes. The side standards, a, are supported against the resistance of the soil by the chains n, the rear ends of which are attached to the middle parts of the side standards, and their forward ends are connected with the opposite sides of the rear end of the tongue C. The seed is covered by the coverers o, the lower parts of which are inclined rearward and downward, and are curved outward and inward to bring their lower ends into proper position to fill the furrows and cover the seed. The shanks of the coverers o extend along and fit against the opposite sides of the plow-standards a, and are secured to the said standards by bolts p. The shanks of the coverers o and the standard a are slotted to receive the fastening-bolts p, so that the said coverers can be readily adjusted to cover the seed to any desired depth. The soil is packed upon the seed, and the tops of the rows are smoothed by wheels q, which are made with wide concaved rims, as shown in Figs. 1 and 2. The wheels q are pivoted to bails r. The center of the bail r of the center wheel q is hinged to the end of a short bar or coupling, s, to give the wheel a free up-and-down movement. The other end of the coupling-bar s is hinged to a hook or other support attached to the center of the rear side of the bar E, to give the wheel a free lateral movement. The centers of the bails r of the side wheels are rigidly attached to rods t, which work in bearings attached to the rear parts of the lower sides of the bars F. Upon the inner ends of the rods t are formed or to them are attached the ends of rearwardly-projecting arms u, which move along the toothed edges of the catch-bars v, attached at their upper ends to the bars F, and are held against the said teeth by guard-springs w, attached at their lower ends to the lower ends of the said catch-bars v. With this construction the rods t, arms u, and catch-bars v will hold the bails r and side wheels q securely in any position into which they may be adjusted, and by operating the said arms u the plows b can be adjusted to work at any desired depth in the ground, or can be raised above the ground for convenience in turning and in passing from place to place. To the rear end of the beam A are attached the lower ends of the handles x, the upper parts of which are connected and held in their proper relative positions by a round, y. To and between the rear parts of the beam A is pivoted a lever, z, the upper end of which projects into such a position that it can be readily reached and operated by the plowman. To the lower end of the lever z, at the lower side of the beam A, is pivoted the rear end of a bar, 1, which passes forward beneath the bar E, is bent upward and forward, and extends forward between the parts of the beam A, and its forward end rests upon the teeth of the ratchet-wheel 2, attached to or formed upon the hub of the drive-wheel B, so that by operating the lever z the said wheel B can be turned to adjust the seed-dropping mechanism when starting in at the side of the field to cause the planting to be done in accurate check-row. To the bar E, at the side of the center seed-box G, is pivoted a lever, 3, the forward end of which enters a groove, 4, in the rear edge of the center slide, H, so that by operating the said lever 3 the seed-dropping slide H I J will be moved to throw the lever T into such a position that the friction-wheel U will not be struck by the side spokes, and the seed-dropping mechanism will be out of gear. To the rear part of the beam A is attached a hook, 5, upon which is pivoted the inner end of a bar, 6, which is made of a length equal to twice the distance apart of the rows, and to its outer end is attached a shoe, 7, to slide upon the ground and serve as a guide to the driver, the shoe 7 running upon the row last planted, and thus enabling the driver to plant the rows at equal distances apart. The bar 6 is supported against the friction of the soil upon the shoe 7 by the chain 8, the rear end of which is attached to the middle part of the said bar 6, and its forward end is hooked upon one or the other of the hooks 9, attached to the outer ends of the bars F. With this construction, when the machine is turned at each side of the field the chain 8 is unhooked from the hook 9, the marker-bar 6 is swung around to the other side of the machine, and the chain 8 is hooked upon the other hook 9, so that the shoe 7 will always slide along the row of hills last planted.

Having thus described my invention, what I claim as new, and desire to secure by Letters Patent, is—

1. In a corn-planter, the combination, with the slotted beam A, the jointed cross-bar E F, and the seed-boxes G, of the drive-wheel B, having side spokes, V, the check-lever T, having friction-wheel U, and the seed-dropping slides H J, connected by pivoted rods I, provided with springs X and collars Y, substantially as herein shown and described, whereby the seed-dropping slides will be operated by the advance of the machine whatever be the position of the parts of the jointed cross-bar, as set forth.

2. In a corn-planter, the combination, with the seed-dropping slides J, made in two parts tongued and slotted to each other, of the connecting-bars P, the levers Q, the catch-plates R, and the lever-holding springs S, substantially as herein shown and described, whereby the parts of the said slides can be readily adjusted to cause the seed-receiving holes to register with the discharge-holes through the bars E, as set forth.

3. In a corn-planter, the combination, with the seed-dropping slide H I J and the plow-standards a, of the pivoted chutes c, having reversely-inclined plates j k and stationary plate l, the bent rods e g, and the springs and collar i h, substantially as herein shown and described, whereby the said chutes will be vibrated to control the dropping of the seed by the movements of the seed-dropping slide, as set forth.

4. In a corn-planter, the combination, with the end parts, F, of the cross-bar, and the draw-bails r, of the side packing-wheels, q, said bails having axial-cranked rearwardly-projecting arms u, and the catch-bars and springs v w, substantially as herein shown and described, whereby the plows can be adjusted and raised from the ground, as set forth.

5. In a corn-planter, the combination, with the slotted beam A and the drive-wheel B, of the lever z, the bar-pawl 1, and the ratchet-wheel 2 upon the drive-wheel, substantially as herein shown and described.

E. BURKHOLDER.

Witnesses:
W. H. JEFFRIES,
W. C. NEIGHBORS.